Figure 1:
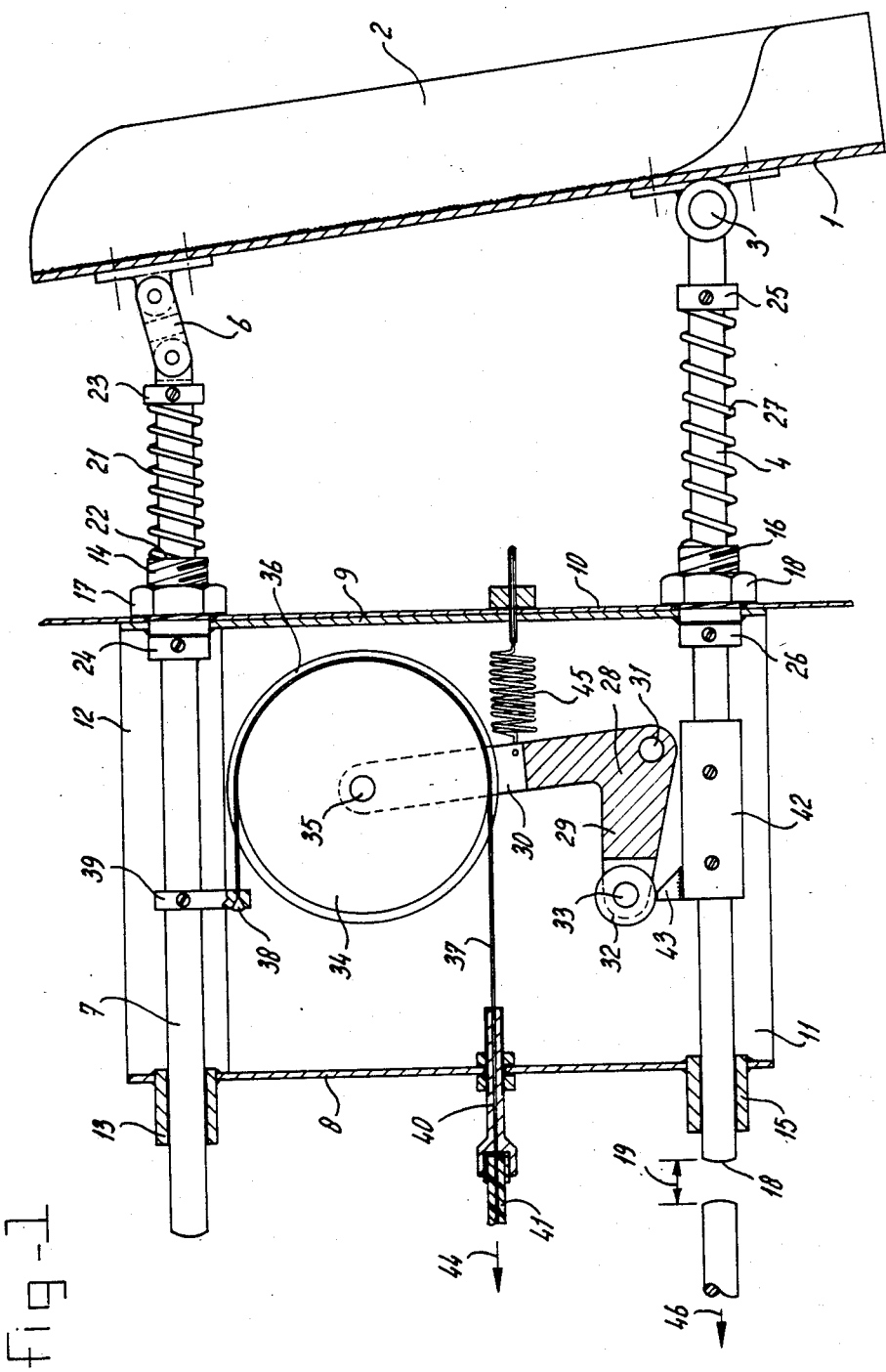

United States Patent [19]

Van Der Vliet

[11] Patent Number: 4,887,701
[45] Date of Patent: Dec. 19, 1989

[54] MOTOR CONTROL-BRAKE DEVICE

[76] Inventor: Timotheus T. Van Der Vliet, Westilijk Halfrond 307, 1183 Hz Amstelveen, Netherlands

[21] Appl. No.: 211,598

[22] Filed: Jun. 27, 1988

[30] Foreign Application Priority Data

Jun. 26, 1987 [NL] Netherlands ............. 8701503

[51] Int. Cl.$^4$ ............................................. B60K 41/20
[52] U.S. Cl. .................. 192/1.56; 192/1.62; 192/1.47; 192/1.58; 192/1.6; 74/478
[58] Field of Search ............ 192/1.56, 1.62, 1.46, 192/1.47, 1.57, 1.58, 1.6; 74/478

[56] References Cited

U.S. PATENT DOCUMENTS

| 2,020,758 | 11/1935 | Abramson et al. | 192/1.56 |
| 2,021,859 | 11/1935 | Jarvis | 192/1.58 |
| 2,042,202 | 5/1936 | Althouse | 192/1.62 |
| 2,087,205 | 7/1937 | Polete | 192/1.58 |
| 2,259,774 | 10/1941 | Perkins | 192/1.62 |
| 2,280,859 | 0/1942 | Siesennop | 192/1.62 |
| 2,936,867 | 5/1960 | Perry | 192/1.62 |
| 3,128,859 | 4/1964 | Griffen | 192/1.56 |
| 4,366,891 | 1/1983 | Maruyama | 192/30 X |

FOREIGN PATENT DOCUMENTS 65048 11/1946 Denmark ............. 192/1.6

Primary Examiner—Leslie A. Braun
Assistant Examiner—Andrea Pitts
Attorney, Agent, or Firm—Bachman & LaPointe

[57] ABSTRACT

Motor control-brake device having a pedal (1) connected at its upper part with a plunger (7) for the motor controlling device and connected at its lower part with a plunger (4) connected with the brake means. Plunger (4) is provided with a cam surface engaging a lever acting on the motor controlling member. This arrangement is such that when the lever is influenced, control by plunger (7) is overruled by the cam, such that at braking the motor controlling member is put in the idle position.

5 Claims, 3 Drawing Sheets fig_1

MOTOR CONTROL-BRAKE DEVICE

This invention relates to a motor control-brake device, comprising a plate shaped part, to be engaged by the foot of the driver, a plunger means engaged in condition of use by the upper side of the plate shaped part and a spaced plunger means engaged by the lower side of the plate shaped part, wherein one of said plunger means is connected with the brake mechanism of the vehicle and the other with an engine controlling member.

Such a device is known from US-A-2,878,908 and comprises a pedal to which pivotally both a brake rod and an accelerator rod are connected. This system has, however, the severe drawback that during braking the engine does not idle because a throttle linkage can be depressed simultaneously and because of this a very judicious control of the foot is necessary. Because of this reason national authorities never give permission to introduce such possibly hazardous systems in cars.

The invention aims to obviate these drawbacks.

According to the invention this object is realized in that said one plunger means being connected with the brake mechanism is provided with means to exclude at its actuation the influence of the other plunger means on the motor controlling member. According to the invention it is no longer of importance how pressure is excerted in case of an emergency stop. By depressing the plunger means for activating the brake system automatically the motor controlling means will be brought back to the intial (pilot) condition.

According to a further preferred embodiment in which the plunger means connected with the brake mechanism has a free stroke wherein the influence of the other plunger means is excluded during that free stroke. Because of this it is impossible that braking and actuating of the motor controlling member occur at the same time.

According to a further preferred embodiment the motor controlling member is connected with a pivotable lever being provided with a surface, which can engage a cam surface actuated by the plunger means connected to the brake mechanism. The lever being moved by the plunger means connected to the brake mechanism through its cam will completely slacken the throttle controlling member when the plunger connected to the brake mechanism is actuated. From the lever the motor controlling member can be connected to the plunger for the motor controlling member either by a linkage or by a pulley. In the last case the motor controlling member comprises a cable being connected with the motor controlling plunger and put in the groove of the pulley. The point of engagement of the motor controlling member and the plunger for the motor controlling member does not need to be a fixed point but can comprise a resilient structure. This is of importance if the pedal advances a considerable length when actuating the plunger connected to the break mechanism. This might for instance be true in a separated brake system during foiling of one of the circuits.

To prevent undue play in the motor controlling member spring means can be provided. However, the tension of such spring means should be such that it does not interfere with functioning of the device.

For adapting the device according to the invention to individual purposes both with regard to the type of vehicle in which it is used and the type of person using it, the plunger means connected with the brake mechanism can be provided with adjustable spring means. Preferably these spring means have a degressive characteristic, which means that after overcoming of a considerable initial force the resistance brought about by this the spring means will decrease. Preferably, the plunger means for the motor controlling member is arranged at the upper side of the pedal.

Figure 2:
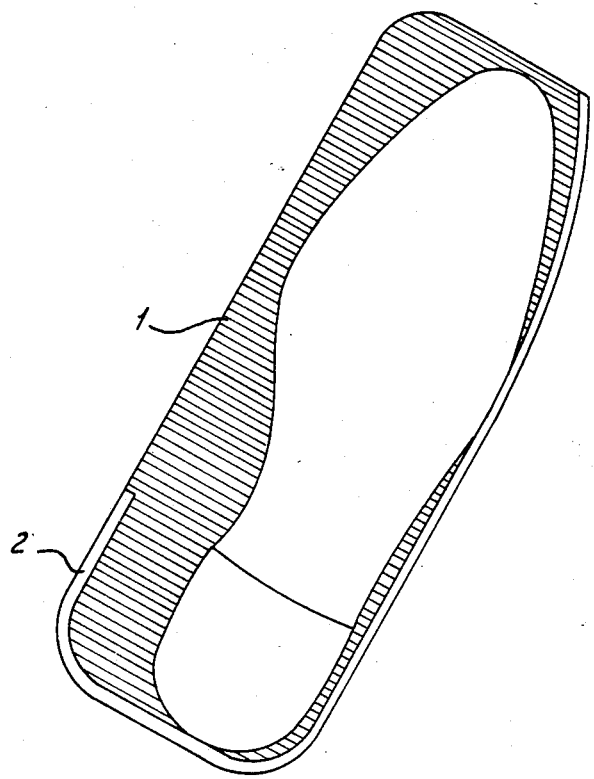
Figure 3:
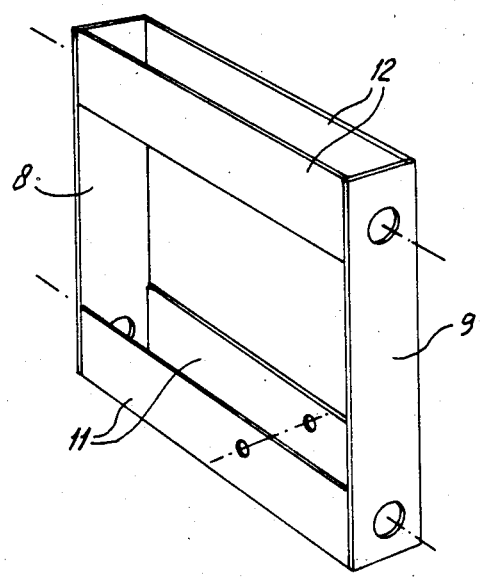
Figure 4:
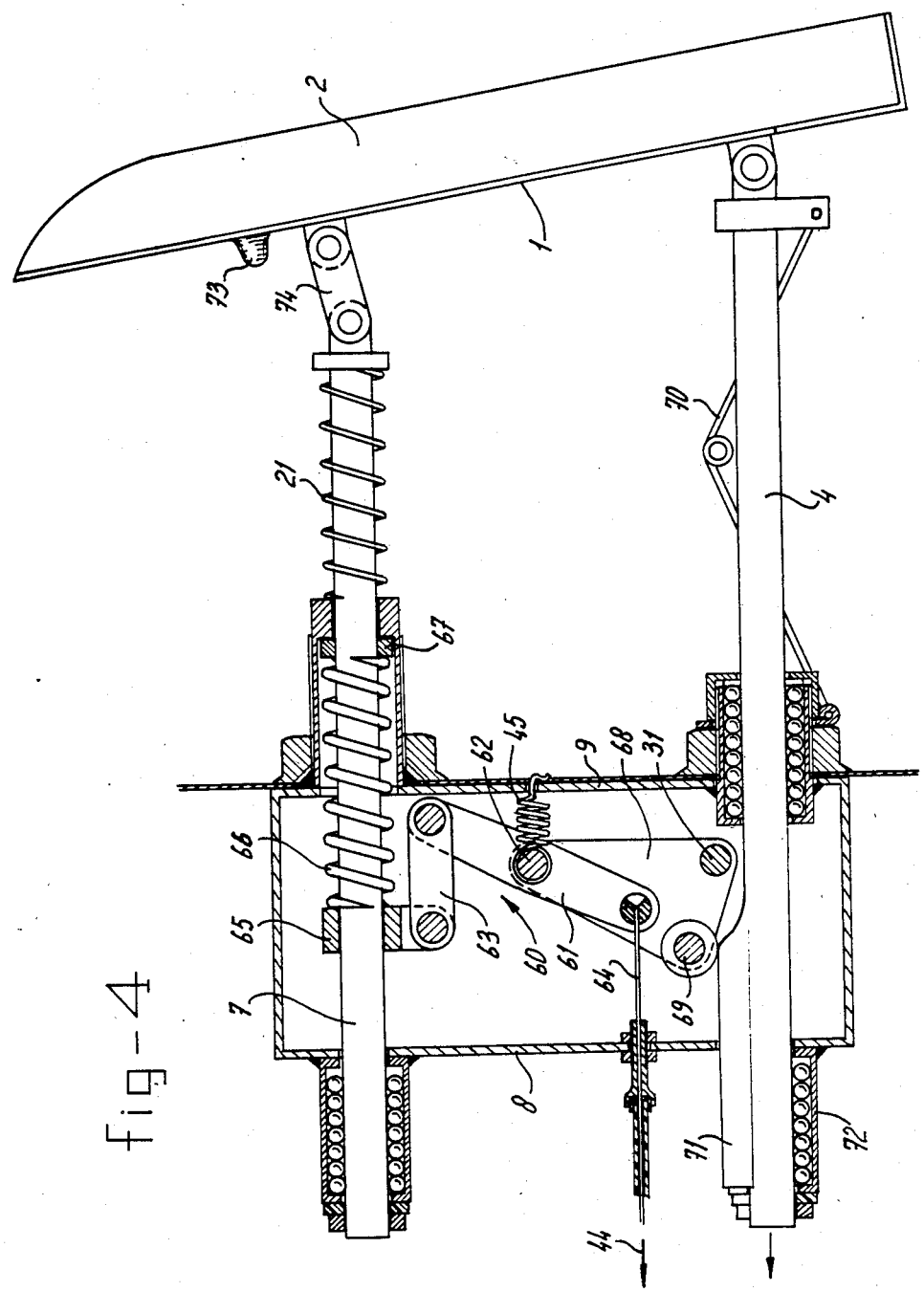

The invention will now be further elucidated with reference to the exemplary embodiments shown in the drawing, in which:

FIG. 1 shows a partial cross section of the device according to the invention, comprising a pedal, frame part and output part, FIG. 2 shows a plan view of the pedal according to FIG. 1, FIG. 3 shows an elevation of the frame part of FIG. 1, and FIG. 4 shows partially in cross section a further embodiment according to the invention.

The device according to FIG. 1 comprises a pedal 1 having a projecting edge 2, with such a shape, that the foot of the driver is compeletly supported by it. Furthermore, the pedal 1 is provided with a non-skid layer and the protruding edge 2 is covered with a layer of durable material which prevents damage to the shoe. At its lower part pedal 1 is connected to brake rod 4 through pivot 3. At its upper end pedal 1 is pivotly connected to accelerator rod 7 through a short intermediate shaft 6 being pivoted at both its ends. This structure enables the pedal to be partly pivoted around pivot points 3 and 6, whereby the gas and brake rod can be moved to and fro straight and without torsion. The frame of the device is realized by two rectangular, oblong, parallel vertical metal plates 8 and 9 having the same shape, being connected at their elongated sides to the upper and lower edge by horizontally arranged metal plates 11 and 12, being in pairs: two at both sides of the upper edge of the plates 8 and 9 and two at both sides of the lower edge of the plates 8 and 9, such that a frame is obtained as shown in FIG. 3. In the plates 8 and 9 at its upper side halfway across the width of the plates bores are provided, in which guide sleeves 13 and 14 are provided perpendicular on the face of the plates. Said guide sleeves are provided with axially and diametrally corresponding bores having a diameter substantially the same as the diameter accelerator rod 7, such that this rod can be moved to and fro in these sleeves. In the plates 8 and 9 at their lower ends half way across the width of the plates bores are also provided, in which guiding sleeves 15 and 16 are perpendiculary mounted on the surface of the plates. Said guiding sleeves are provided with axially and diametrally corresponding bores having a diameter substantially the same as the diameter of the brake rod 4, such that this brake rod is able to move to and fro in these sleeves. The distance from center to center between the guiding sleeves 13 and 15 is the same as the distance from center to center between the guiding sleeves 14 and 16, such that the accelerator rod is parallel to the brake rod. The diameter of the accelerator rod is also the same as the diameter of the brake rod. The metal screen 10, providing in the partition between the engine compartment and the interior of the vehicle, is at the spot of the guiding sleeves 14 and 16 provided with bores having a diameter being sufficient to pass the guiding sleeves, being externally provided with screw thread. The frame is rigidly screwed against screen 10 by means of appropriate nuts 17 and 18. A compression spring 21 is slid over accelerator rod 7, bearing at the side of the frame against collar 22 of the guiding sleeve 14. Said collar 22 is realized by the difference in internal and external diameter of the guiding sleeve. At the pedal side the spring is stopped by a cylindrical ring 23 having an internal and external diameter equal to the diameter of the guiding sleeve 14 and provided with recessed head screws by which the ring is fixed to the accelerator rod 7. A sleeve ring 23 having the same size as sleeve ring 24 is arranged on the accelerator rod 7 at the front side of the guiding sleeve 14. As sleeve rings 23 and 24 can be slided over and fixed to the accelerator rod 7, it is possible to mount compression spring 21 under a desired tension, by which the accelerator rod 7 is able to move to and fro over a limited distance, i.e. the total stroke of the rod from either idle r.p.m. to maximum (accelerator pedal fully depressed) r.p.m. The accelerator rod will, not being activated by the pedal 1, always have a initial position because the pressure of spring 21 on ring 23, pressures ring 24 against guiding sleeve 14. The same structure applies to brake rod 4, in which with cylindrical rings (sleeve rings) 25 and 26 and compression spring 27 in the same way a limited movement of the brake rod is obtained being the same as that of the accelerator rod 7, wherein the defined distances of the accelerator and brake rod do not have to be the same. In the frame a hook shaped arm 28 is arranged having a long part 30 and a short part 29. This arm can be rotated around a shaft 31, being introduced in axially and diametrally corresponding bores arranged perpendicular to the face of the plates 11 and the arm 28 itself. Near the end of the short part 29 of the arm a roller bearing 32 is provided, being able to rotate around a shaft 33, being introduced in axially and diametrally corrsponding bores in this part 29 of the arm and the roller bearing 32 itself. Near the end of the long part 30 of the arm a pulley 34 is arranged, being able to rotate around a shaft 35, being introduced in axially and diametrally corresponding bores provided in this part 30 of the arm and the pulley itself. The circumference of this pulley is provided with a groove 36 wherein a cable 37, hereafter referred to as accelerator cable, is guided appropriately. The one end of the accelerator cable is connected to a lug 38 provided on a cylindrical ring 39, having the same sizes as the rings 23 and 24 and being slideable over the accelerator rod. The other end of the accelerator cable is connected with the engine controlling mechanism. To this end the accelerator cable extends from lug 38 first in groove 36 of pulley 34 and subsequently through adjustable stop 40 arranged in plate 8 of the frame and enclosed by outer cable 41 to motor control system 44. On the brake rod near the arm part 29 a cylindrical sleeve 42 is arranged having a defined length and the same specifications as rings 25 and 26. On this cylindrical sleeve 42 near the front side in longitudinal direction a cam 43 is provided, rising obliquely from the back to the front. The cylindrical sleeve 42 is positioned such on brake rod 4, that the highest horizontally flattened part of the cam is perpendicular under the axis of the shaft 33 of the roller bearing 32, the brake rod not being activated by the pedal 1 and the brake rod will be in its initial position, wherein ring 26 lies against guiding sleeves 16 and the roller bearing rests on the highest point of the cam 43. Now accelerator cable will be adjusted in its length by adjustable stop 40 such that the engine will be adjusted to its idle r.p.m. This adjustment is realized with the accelerator rod in its initial position, wherein ring 24 lays against guiding sleeve 14. It has to be noted that the shaft 31 is placed at such a distance above brake rod 4, that cylindrical sleeve 42, being fixed to brake rod 4, can move without contacting shaft 31. Furthermore, the axis of the shaft 33 is in this nearly vertical position of the arm part 30 somewhat above the axis of shaft 31 to obtain a more favorable stop angle of roller bearing 32 with the oblique side of cam 43. If now only the upper side of the pedal is depressed, arm 28 will be blocked, as the roller bearing 32 rests on the upper side of the cam 43 and the accelerator cable will now be drawn forwardly by its lug connection with the accelerator rod, during which movement pulley 34 will rotate around shaft 35 and displace the accelerator rod near stop 40 against the spring tension of system 44 in rearward direction, by which the power of the engined will be increased. If the upper side of the pedal is completely depressed, in which position lug 38 will have its maximum forward position and spring 21 is maximally compressed, the engine will be adjusted to its maximum r.p.m. or "full throttle". If from this "full throttle" position or any other position to its initial position, also the lower part of the pedal is depressed, during which movement cam 43 is moved forwardly, roller bearing 32 will be moved downwardly through the oblique side of the cam 43 until roller bearing is resting on the upper side of the cylindrical sleeve 42. The shaft 35 will undergo a same angular displacement relative to shaft 31 as shaft 33. By this forward rotation of arm 31 so much of the length of the throttle cable will be given back to system 44, that the engine is adjusted to its idle r.p.m. In this moment also the front end of the brake rod will contact the brake system 46 of the vehicle by which actual braking starts.

Decreasing of the power of the engine from "full throttle" to "idle" with the brake pedal occurs during the so-called free stroke 19 of the brake rod. The arm parts 29 and 30 have such a length ratio, that during a downward movement of the roller bearing 32 over a given distance, the accelerator cable at the stop 40 can slide over a length of at least four times the given distance, such that the free stroke of the brake rod can be kept relatively small. By adjusting the pretension of the spring 27 on the brake rod or by providing a weaker or stronger spring, the device can be adjusted in two ways or for two different styles of driving. When using a considerable pretension of spring 27, which however, will not substantially interfere with depressing of the brake rod, the following will occur if the accelerator rod is in "full throttle" position and the brake rod is in "full brake" position. The front of the foot keeps the gas rod depressed to "full throttle" while the heel part of the foot lets the brake rod rise, during which cam 43 is pressed against roller bearing 32 with sufficient force to move this upwardly, by which first of all the effect of braking will be released and after this the engine will be adjusted to maximum power. By keeping the accelerator rod depressed, it is possible with the help of the brake rod to alternatively brake and accelerate in a very fast accurate and smooth way by alternatively depressing and raising of the lower part of the pedal. By giving spring 27 a lower pre-tension or by using a weaker spring the following will occur: at rising of the brake rod from the "full brake" position and the accelerator rod in the "full throttle" position the cam will not be pressed sufficiently against the roller bearing to rotate arm 28. Now first of all the upper side of the pedal has to be raised, to decrease the force on the arm part 30 originating from the tension in the accelerator cable, by which cam 43 can pass under roller bearing 32. Now arm 28 is blocked and it is possible to accelerate again. The first adjustment is very well suited for a sportive style of driving i.e. for racing drivers or rally drivers, who wish to have full power directly after braking. Furthermore, with this adjustment it is also possible to drive away on a sloping surface without using the hand brake.

The other adjustment is suitable for somewhat calmer drivers having a more moderate way of driving. However, both adjustments have the same quick change of accelerating to braking. If one starts from the initial position of the pedal and only depresses the lower side, the arm 28 will try to rotate in forward direction by the position of its center of gravity with regard to shaft 31. Because of this the accelerator cable could be slackened in the frame. To obviate this the arm part 30 is connected by a weak adjustable tension spring 45 with plate 9 of the frame. Because of this the accelerator cable will always be pre-tensioned by which it is prevented that the accelerator cable can slip from groove 36 of the pulley. The frame can be sealed by plastic or metal covers to prevent dust and so on from entering. The pedal can be adjustable with regard to its upper side and can be adapted to the individual requirements of the car and desires of the driver.

In FIG. 4 an alternative embodiment of the device according to the invention is shown. In this embodiment of the accelerator cable 64 is connected with accelerator rod through linkage 60 comprising a first arm 61 pivoting around shaft 62 and a second arm 63. An accelerator cable 64 is connected on one end of the arm 61 while on the other end of the first arm 61 second arm 63 is pivotally connected. The other end of arm 63 spaced from first arm 61 is pivotally connected to slide block 65 and which in turn is connected to one end of spring 66. This spring 66 is a relatively strong spring and its other end is connected to sleeve 67 fixed to rod 7. Shaft 62 is connected to triangular plate 68 being itself rotatable around shaft 31. Rotation is controlled by roller bearing 69. For moving brake rod 4 outwardly spring 70 is provided, having a degressive characteristic and being adjustable. Roller bearing 69 is able to run over cam surface 71 and bearing 72 is arranged such that the cam surface extends through said bearing. Spring 45 functions to take up any slack in the accelerator cable 64.

This device functions as follows: During normal driving, throttle cable 64 will be actuated by depressing the top end of pedal 1. Because of the relatively stiff spring slide 66 block 65 will move together with sleeve 67. Because of the degressive characteristic of spring 70 during normal conditions an initial relatively high force has to be placed on the lower side of pedal 1 to move brake rod 4. However, after this force has been overcome actuating of the brake mechanism will be interfered in a progressively lower rate by the characteristic of the spring. Compared with the FIG. 1 embodiment, it is possible to have the brake rod 4 travel a long extent. This is important in brake systems with separated circuits. If one circuit fails the pedal has to be depressed over a relatively considerable extent. Because of the special roller bearing 72 and cam surface 71 extending through said bearing, cam surface 71 will not abut against this bearing. However, if spring 66 and slide block 65 were not provided, the lower side of the pedal would travel a considerable amount inwardly while the upper side of the pedal would travel a relatively short distance, thus creating a foot position, too awkward to cope with for the ankle joint, if one of the brake circuits would fail. To prevent this, spring 66 with sleeve block 65 is provided,. When pedal 1 is depressed considerably spring 66 will be compressed in this emergency case. Thus keeping the pedal approximately parallel to plate 9 of the frame and managable for the ankle joint of the driver. Also in this embodiment it is possible to adjust the system to different driving styles as well as to the weight and size of the driver. For light weight drivers a relatively weak spring 70 will be sufficient while for heavy weight drivers a stronger spring can be desirable. This can easily be made possible by making spring 70 adjustable. Abutment 73 of resilient rubber is provided to promote returning of link 74 in its original position after collapsing if pedal is completely depressed with its upper part.

Although the embodiments shown above are preferred to at the time being, it has to be understood that they do not restrict the scope of protection of the invention as claimed in the appended claims. It has to be understood that many modifications can be made being within in the range of the person skilled in the art. For instance it is possible to adapt the system to a motor control system in which no cable is used but a linkage or a potentiometer. Furthermore it is also possible to have the springs arranged on another place while performing the same function.

What is claimed is:

1. Motor control brake device comprising: a brake mechanism; an engine controlling member; a plate-shaped part having an upper side and a lower side and adapted to be engaged by the foot of the driver; a plunger means engaged in the condition of use by the upper side of the plate-shaped part; a spaced plunger means engaged by the lower side of the plate-shaped part, wherein one of said plunger means is connected with the brake mechanism and the other with the engine controlling member, said plunger means connected with the brake mechanism being provided with cam means to exclude at its actuation the influence of the other plunger means of the engine controlling member; a pivoting member connected to the engine controlling member provided with a surface which engages said cam means, wherein said cam means is actuated by the plunger means connected to the brake mechanism, whereby the plunger means for the engine controlling member is made completely ineffective to control said engine controlling member.

2. Device according to claim 1 wherein said engine controlling member is connected with both the lever and the plunger means for the engine controlling member through a linkage.

3. Device according to claim 1 wherein the engine controlling member comprises a cable arranged around a pulley being pivotally connected to said lever and wherein the extremity of the cable is connected with the plunger means for the engine controlling member.

4. Device according to claim 1 wherein the plunger means connected with the brake mechanism is provided with adjustable spring means.

5. Device according to claim 4 wherein said spring means is characterized by the resistance of the spring means decreasing after overcoming an initial force.

* * * * *